(12) United States Patent
Shen et al.

(10) Patent No.: US 11,491,457 B2
(45) Date of Patent: Nov. 8, 2022

(54) ZINC OXIDE BASED SORBENT AND PROCESS FOR PREPARING SAME

(71) Applicant: Research Triangle Institute, Research Triangle Park, NC (US)

(72) Inventors: Jian-Ping Shen, Chapel Hill, NC (US); Jason S. Norman, Chapel Hill, NC (US); Brian S. Turk, Durham, NC (US); Raghubir Gupta, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 333 days.

(21) Appl. No.: 16/635,790

(22) PCT Filed: Aug. 1, 2018

(86) PCT No.: PCT/US2018/044781
§ 371 (c)(1),
(2) Date: Jan. 31, 2020

(87) PCT Pub. No.: WO2019/028127
PCT Pub. Date: Feb. 7, 2019

(65) Prior Publication Data
US 2021/0121850 A1 Apr. 29, 2021

Related U.S. Application Data

(60) Provisional application No. 62/540,028, filed on Aug. 1, 2017.

(51) Int. Cl.
*B01J 20/08* (2006.01)
*B01D 53/02* (2006.01)
*B01J 20/28* (2006.01)
*B01J 20/30* (2006.01)

(52) U.S. Cl.
CPC ............. *B01J 20/08* (2013.01); *B01D 53/02* (2013.01); *B01J 20/28004* (2013.01); *B01J 20/28011* (2013.01); *B01J 20/28019* (2013.01); *B01J 20/3071* (2013.01); *B01J 20/3078* (2013.01); *B01J 20/3085* (2013.01); *B01D 2253/1124* (2013.01); *B01D 2253/304* (2013.01); *B01D 2257/304* (2013.01)

(58) Field of Classification Search
CPC .............. B01J 20/08; B01J 20/28004; B01J 20/28011; B01J 20/28019; B01J 20/3071; B01J 20/3078; B01J 20/3085; B01D 53/02; B01D 2253/1124; B01D 2253/304; B01D 2257/304
USPC ............................................................ 502/9
See application file for complete search history.

(56) References Cited

U.S. PATENT DOCUMENTS

| 5,710,091 A | 1/1998 | Khare |
| 6,951,635 B2 | 10/2005 | Gangwal et al. |
| 7,956,006 B2 | 6/2011 | Gangwal et al. |
| 2004/0234448 A1 | 11/2004 | Hillion et al. |
| 2010/0170394 A1 | 7/2010 | Dodwell et al. |
| 2013/0028822 A1 | 1/2013 | Bourane et al. |

FOREIGN PATENT DOCUMENTS

| CN | 106622204 A | 5/2017 |
| GB | 507593 A | 6/1939 |
| JP | 2000202279 A | 7/2000 |
| WO | 2005/058468 A2 | 6/2005 |

OTHER PUBLICATIONS

El-Hakam, S.A., Structure, texture and catalytic activity of ZnO/Al2O3 catalysts, Colloids and Surfaces, Feb. 3, 1999, 157-166, 157, Elsevier, Amsterdam. (10 pages).
Extended European Search Report in related European Application No. 18840207.7 filed Aug. 1, 2018, dated Mar. 30, 2021. (2 pages).
Examination Report in related Indian Application No. 201917046090 filed Aug. 1, 2018, dated Sep. 15, 2021. (5 pages).
Foreign Office Action in related Indonesian Application No. P00201910456 dated Oct. 8, 2021.
Notification of Reasons for Refusal dated Apr. 5, 2022 for associated Japanese Patent Application No. 2019-565372 with translation (11 pages).
PCT/US2018/044781 International Search Report, dated Dec. 18, 2018, international Application Division Korean Intellectual Property Office.
PCT/US2018/044781 Written Opinion of the International Searching Authority, dated Dec. 18, 2018, International Application Division Korean Intellectual Property Office.
Sasoka, E., et al. "Stability of Zinc Oxide High-Temperature Desulfurization Sorbents for Reduction." Energy & Fuels, vol. 8, No. 3, 763-769 (1994), American Chemical Society.

(Continued)

*Primary Examiner* — Edward M Johnson
(74) *Attorney, Agent, or Firm* — Olive Law Group PLLC; Nathan P. Letts

(57) ABSTRACT

Zinc oxide-based sorbents, and processes for preparing and using them are provided, wherein the sorbents are preferably used to remove one or more reduced sulfur species from gas streams. The sorbents contain an active zinc component, optionally in combination with one or more promoter components and/or one or more substantially inert components. The active zinc component is a two-phase material, consisting essentially of a zinc oxide (ZnO) phase and a zinc aluminate ($ZnAl_2O_4$) phase. Each of the two phases is characterized by a relatively small crystallite size of typically less than about 50 nm (500 Angstroms). Preferably the sorbents are prepared by using an alkali metal base to convert a precursor mixture, containing a precipitated zinc oxide precursor and a precipitated aluminum oxide precursor, to the two-phase, active zinc oxide containing component, with the resulting sorbent having a sodium level within a desired range.

21 Claims, 3 Drawing Sheets

(56) References Cited

OTHER PUBLICATIONS

Figure 1:
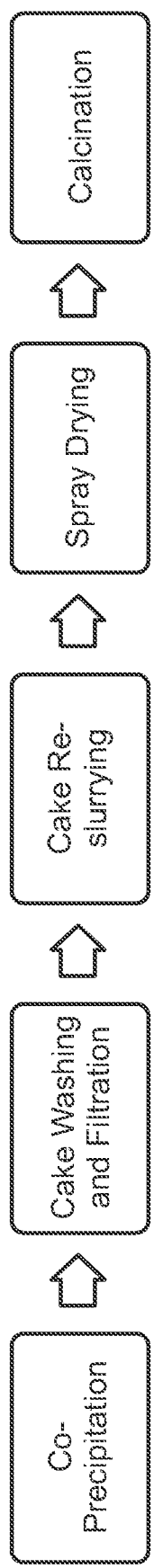

Sasoka, E., et al. "Characterization of Reaction between Zinc Oxide and Hydrogen Sulfide." Energy & Fuels, vol. 8, No. 5, 1100-1105 (1994), American Chemical Society.
Chinese Examination Report dated May 18, 2022 for associated Chinese Application No. 201880050040.3 (10 pages).
Translation of Chinese Examination Report dated May 18, 2022 for associated Chinese Application No. 201880050040.3 (6 pages).

ZINC OXIDE BASED SORBENT AND PROCESS FOR PREPARING SAME

CROSS REFERENCE TO RELATED APPLICATIONS

This application is a 371 national stage patent application, which claims priority to PCT International Patent Application No. PCT/US2018/44781, filed Aug. 1, 2018, Jian-Ping Shen et al., which claims the benefit of 62/540,028 filed Aug. 1, 2017, Jian-Ping Shen et al., which are hereby incorporated by reference in their entireties.

STATEMENT REGARDING FEDERALLY SPONSORED RESEARCH OR DEVELOPMENT

This invention was made with Government support under Contract No. DE-FE0000489 awarded by the U.S. Department of Energy (DOE). The United States Government has certain rights in the invention.

1. FIELD

This disclosure relates to zinc-oxide-based sorbents, and to the processes for preparing and using these sorbents. More specifically, the disclosure relates to attrition resistant, fluidizable, zinc oxide-based sorbents, and to processes for making and using them.

2. BACKGROUND

2.1. Introduction

Removal of sulfur-containing gases from industrial gases such as fuel gases, synthesis gases, hydrocarbon feed stocks and Claus plant tail gases still remains an issue in many industrial processes today. One of the most useful developments in this area of sulfur-removal research was the development of zinc oxide-based sorbents that can react with reduced sulfur components and remove them from a gas stream.

One such class of materials was described by Gangwal et al. in U.S. Pat. No. 6,951,635, issued Oct. 4, 2005. This patent is incorporated herein by reference in its entirety. U.S. Pat. No. 6,951,635 describes the synthesis and characterization of various zinc-containing substances and the use of these substances for the removal of reduced sulfur species, particularly $H_2S$ and COS, from a gas stream.

The described active zinc component disclosed by Gangwal et al., is a two-phase material consisting essentially of a zinc oxide (ZnO) phase and a zinc aluminate ($ZnAl_2O_4$) phase; each of these two phases is uniformly distributed throughout the active, sorbent particles, and each of the two phases is characterized by a relatively small crystallite size of typically less than about 50 nm (500 Angstroms) as determined by x-ray diffraction (XRD) line broadening analysis.

These materials remove the reduced sulfur components from a warm gas stream at temperatures as low as 400° F. (204° C.) and at temperatures as high as 1000° F. (538° C.) and thus provide a substantial degree of flexibility allowing removal of undesirable sulfur components from a feed gas in a selected temperature range. Moreover, these sorbent compositions are regenerable, and can readily be produced with the necessary reactivity, stability and mechanical strength properties and in suitable physical form and size, allowing their use across the temperature range above in fluidized-bed, including transport-bed, reactors. As disclosed in U.S. Pat. No. 6,951,635, the zinc oxide-based sorbents can be regenerated upon loss of the sulfur contaminants when the regeneration process is carried out at temperatures in the range of between about 950° F. (about 510° C.) and about 1350° F. (about 704° C.) in the presence of a gas flow comprising oxygen. The sulfur contaminants are removed from the zinc oxide-based sorbent primarily as $SO_2$ gas during the regeneration process.

These attrition-resistant, zinc oxide-based sorbents were prepared by converting a precursor mixture comprising a precipitated zinc oxide precursor and a precipitated aluminum oxide precursor to the two-phase, active zinc oxide-containing component. It was disclosed that by using precipitated precursors, promotion of enhanced mixing and uniform distribution of the zinc oxide and zinc aluminate phases occurred in the active zinc sorbent component. This also promoted the formation of small crystallite phases in the active zinc component. These qualities gave the disclosed products a better level of chemical reactivity and high-temperature stability of the sorbent when compared to conventionally-prepared zinc aluminate materials.

The processes for preparation of these precursors and the active sorbents are described in detail in U.S. Pat. No. 6,951,635. This patent also discloses the qualities and characteristics of the resulting products and the methods that can be employed to use these materials to remove sulfur-containing materials such as $H_2S$ and COS from a warm gas as well as the processes for regeneration of the zinc oxide-based sorbents.

For example, according to one preferred aspect disclosed in U.S. Pat. No. 6,951,635, the attrition resistant zinc oxide-based sorbent of the invention is prepared by spray drying a slurry which comprises a precipitated zinc oxide precursor and a precipitated aluminum oxide (alumina) precursor. These precipitated zinc oxide precursors and precipitated alumina precursors included, for example, hydroxides. Those hydroxides were precipitated from dissolved nitrates, sulfates, chlorides, acetates, alkoxides and like salts of zinc and aluminum. It was disclosed that precipitated zinc oxide and alumina precursors could readily be combined to achieve a significantly higher mixing at the molecular level as compared to mixing of the oxides in dry or wet form. In turn, the final zinc oxide-based sorbent was disclosed to contain a zinc oxide (ZnO) phase and a zinc aluminate ($ZnAl_2O_4$) phase that are uniformly distributed throughout the sorbent, and each of the two phases were disclosed to be characterized by a relatively small crystallite size. The precursors of the zinc oxide phase and zinc aluminate phases were formed when the dissolved salts of zinc and aluminum were pumped into a container while a concentrated solution of ammonium hydroxide was introduced simultaneously into the container. The pH of the reaction slurry was adjusted by controlling the flow rates such that a pH of about 6.0 was maintained in the reaction mixture at room temperature.

U.S. Pat. No. 6,951,635 discloses that the preferred zinc oxide and alumina precursors were $Zn(NO_3)_2$ and $Al(NO_3)_3$, respectively, and that at least 50 wt % (as zinc oxide) of dry solids content of the slurry is made up by the precipitated zinc oxide precursor or derivative which is in the form of a wet filtered cake recovered directly from a precipitation process or step. In addition, it is disclosed that preferably at least 20 wt % (as $Al_2O_3$) of dry solids content is made up by the precipitated aluminum oxide precursor or derivative and that the aluminum oxide precursor is also in the form of a wet filtered cake well mixed with the zinc oxide precursor cake recovered directly from a precipitation process or step. In addition, the patent also discloses that in a preferable embodiment the precipitated zinc oxide precursor and the precipitated aluminum oxide precursor are simultaneously formed in a coprecipitation process, such as when ammonium hydroxide is added to a mixture of zinc oxide precursor and aluminum oxide precursor.

In a preferred embodiment of U.S. Pat. No. 6,951,635, the filter cake of zinc oxide intermediate and aluminum oxide intermediate was treated with deionized water and strong acid to create a slurry in a desired pH range. The slurry was then spray dried using conventional processes and apparatus to form substantially spherical spray dried particles. The spray drying conditions were disclosed to be adjusted to provide "green" spray dried particles of a size such that at least 80 percent by volume of the particles had a diameter of between 40 and 255 µm.

In U.S. Pat. No. 6,951,635, it was disclosed that the "green" spray dried particles were calcined in an oxygen containing environment to convert the hydroxides to zinc oxide, aluminum oxide and zinc aluminate. The calcining step also was disclosed to result in shrinkage of the spray-dried particles to an average size distribution within the range of 35 to 175 µm. The disclosure recited that typically the calcining temperature exceeded 300° C., and was preferably a temperature exceeding 500° C.; and more preferably at or exceeding 650° C. In fact, it was disclosed that the calcining would preferably be conducted at a temperature that was about the same, or higher, than the intended initial regeneration temperature. As known in the art, this technique can enhance stabilization of the physical and chemical properties of a sorbent during its subsequent use.

Although the preparations of zinc oxide-based sorbents as disclosed in U.S. Pat. No. 6,951,635 were successful and generated effective materials for the desulfurization of warm gases, the process for the generation of these sorbents involved the use of an ammonium hydroxide solution to generate and coprecipitate the zinc oxide-based intermediates and aluminum oxide-based intermediates required for the manufacture of the final products. This led to the production of ammonia-containing wastes from the manufacturing processes for these products. In an effort to minimize the production of ammonia-containing wastes for environmental reasons, we began to investigate alternative processes for the production of similar zinc oxide-based sorbents using other non-ammonia based hydroxides and carbonates of alkali metals.

3. SUMMARY OF THE DISCLOSURE

The disclosure provides a fluidizable, attrition-resistant sorbent for removing at least one reduced sulfur species from a feed stream comprising: substantially spherical particles, said particles comprising at least 75 wt % of an active zinc component consisting essentially of a zinc oxide phase and a zinc aluminate phase, each of said phases having a crystallite size of less than about 50 nm (500 Angstroms) as determined by x-ray diffraction line broadening analysis, said active zinc component having a total zinc oxide content, calculated based on the combined zinc oxide of said zinc oxide phase and said zinc aluminate phase, of from about 50 wt %, to about 80 wt %, based on the weight of said active zinc component, wherein the residual sodium level in the solid phase is in the range of between about 25 parts per million by weight of sodium and about 2500 parts per million by weight of sodium.

For the fluidizable, attrition-resistant sorbent above, the residual sodium level in the solid phase is in the range of between about 50 parts per million by weight of sodium and about 1000 parts per million by weight of sodium. Alternatively, the residual sodium level in the solid phase is in the range of between about 75 parts per million by weight of sodium and about 750 parts per million by weight of sodium.

In one embodiment, reduced sulfur species is $H_2S$.

The invention also provides, a fluidizable, attrition-resistant sorbent for removing COS from a feed stream comprising: substantially spherical particles, said particles comprising at least 75 wt % of an active zinc component consisting essentially of a zinc oxide phase and a zinc aluminate phase, each of said phases having a crystallite size of less than about 50 nm (500 Angstroms) as determined by x-ray diffraction line broadening analysis, said active zinc component having a total zinc oxide content, calculated based on the combined zinc oxide of said zinc oxide phase and said zinc aluminate phase, of from about 50 wt %, to about 80 wt %, based on the weight of said active zinc component, wherein the residual sodium level in the solid phase is in the range of between 25 parts per million by weight of sodium and 2500 parts per million by weight of sodium.

According to one aspect, the present invention provides environmentally friendly zinc oxide-based sorbent compositions capable of removing reduced sulfur species, particularly $H_2S$ and COS, from a gas stream. The sorbent compositions are regenerable, and can readily be produced with the necessary reactivity, stability, and mechanical strength properties, and in a suitable physical form and size, allowing their use across a temperature range including relatively low temperatures and relatively high temperatures, in fluidized-bed, including transport bed, reactors. According to another aspect, the present disclosure provides a process for removal of $H_2S$ and COS from a reducing gas stream, at a temperature that can be as low as about 350° F. or as high as about 1150° F. and preferably in the range of from 375° F. to 1075° F. at pressures in the range from 1 atmosphere to 100 atmospheres. We note that temperatures can be influenced by the pressures used for the chemical conversions with lower temperatures required at higher pressures of gases; such relationships and properties are well known in the art. In currently preferred embodiments, the warm gas stream can have a substantial steam content, sometimes exceeding 60% by volume, but more typically in a range between 0% and 30% by volume.

The sorbent compositions of the disclosure comprise an active zinc component, optionally in combination with one or more promoter components and/or one or more substantially inert components. The active zinc component preferably constitutes at least about 75 wt % (weight percent), more preferably at least about 80 wt %, even more preferably at least about 90 wt %, and yet more preferably at least about 95 wt %, of the sorbent composition. The active zinc component is a two-phase material, consisting essentially of a zinc oxide (ZnO) phase and a zinc aluminate ($ZnAl_2O_4$) phase. Each of the two phases is somewhat uniformly distributed throughout the active, sorbent particles, and each of the two phases is characterized by a relatively small crystallite size of typically less than about 35 nm (350 Angstroms) and preferably less than 30 nm (300 Angstroms), more preferably less than about 25 nm (250 Angstroms), as determined by x-ray diffraction line broadening analysis. Advantageously, the total zinc oxide content of the active zinc component is an amount, calculated as "total ZnO" (which includes both uncombined zinc oxide, i.e., the zinc oxide which constitutes the zinc oxide phase, and combined zinc oxide, i.e., the ZnO content of the zinc aluminate phase wherein $ZnAl_2O_4$ is taken to be the combination of ZnO and $Al_2O_3$), of at least about 50 wt %, up to about 80 wt %, preferably at least about 50 wt % up to about 70 wt %, based on the total weight of the active zinc component.

Preferably the attrition resistant, zinc oxide-based sorbents of the disclosure are prepared by converting a precursor mixture, comprising a precipitated zinc oxide intermediate and a precipitated aluminum oxide intermediate, to the two-phase, active zinc oxide containing component. The use of precipitated intermediates, which typically have an extremely small particle size, promotes enhanced mixing and uniform distribution of the zinc oxide and zinc aluminate phases in the active zinc sorbent component, and also promotes formation of small crystallite phases in the active zinc component. The unusually small crystallite sizes, and uniform distribution of the zinc oxide and zinc aluminate phases enhance the mechanical strength of the sorbent and are also believed to enhance the chemical reactivity and high temperature stability of the sorbent.

Currently the small crystalline size, two-phase, active zinc component is preferably obtained by employing the sorbent-preparation process identified below. According to this process, an aqueous slurry containing a mixture of precursors of zinc oxide and alumina, is spray dried to form precursor sorbent particles of a desirable size, and the precursor particles are thereafter calcined to convert the precursors into the two-phase (zinc oxide and zinc aluminate) active zinc component. The use of extremely small non-oxide precursors, allows mixing of the zinc and aluminum components at a "near-molecular level" prior to formation of any sorbent structure whatsoever. Accordingly, this process allows small amounts of zinc oxide to be highly dispersed throughout the sorbent, providing high reactivity. In addition, the high surface area and preferred uniform mixing of the precursors allows the formation of zinc aluminate using less harsh calcinations conditions than are required by conventional zinc aluminate forming processes which involve a solid-state reaction between alumina and zinc oxide.

Preferably, the sorbent compositions of the disclosure are substantially spherical particles having sizes in the range of from 25 to 175 micrometers (μm), preferably from 35 to 150 μm, more preferably from 40 μm to 140 μm, and more preferably from 40 μm to 120 μm, as determined by conventional screening processes. As used herein substantially spherical means the diameter of the sphere in the X-axis is within about ±40% of the diameter in the Y-axis or the Z-axis. In another embodiment, the diameter of the sphere in the X-axis is within about ±25% of the diameter in the Y-axis or the Z-axis. In yet another embodiment, the diameter of the sphere in the X-axis is within about ±10% of the diameter in the Y-axis or the Z-axis. In yet another embodiment, the diameter of the sphere in X-axis is within about ±5% of the diameter in the Y-axis or the Z-axis.

In preferred embodiments, the attrition resistant, zinc oxide-based sorbent compositions of the disclosure have a compacted bulk density exceeding 1 g/cm$^3$ (gram per cubic centimeter), preferably exceeding 1.3 g/cm$^3$ and more preferably in the range of between 1.6 and 2.0 g/cm$^3$. The most preferable range for the bulk density of the particles is between 1.7 and 2.0 g/cm$^3$. Additionally, the attrition index (AI) of the preferred zinc oxide-based sorbent compositions as measured by ASTM-D5757-95 is preferably less than 2, where AI is defined as in U.S. Pat. No. 6,951,635, column 6, and wherein "Attrition" is determined in accordance with the above-identified ASTM Standard in each instance. The relatively high bulk density in preferred sorbents of the disclosure, can allow a higher feed stream throughput in various fluidized bed environments, can enhance temperature control of the overall process due to the higher heat capacity of the particles, and can allow the use of larger mass quantities of the active sorbent within the fixed volume of a given reactor, as compared to a lower density sorbent. As will be apparent, the preferred AI values effectively allow the economical use of the sorbent particles in high velocity fluidized-bed or transport-bed environments.

According to another aspect, the present disclosure provides a process for preparing attrition resistant, zinc oxide-based sorbent compositions by converting a mixture of precipitated zinc oxide and aluminum oxide precursors to the two-phase, active zinc component using alkali metal hydroxides or alkali metal carbonates. The use of co-precipitation techniques, promotes enhanced mixing and uniform distribution of the final sorbent components, and additionally promotes formation of small crystallite phases in the final sorbent product. In the coprecipitation method using alkali metal hydroxides or carbonates, and in contrast to the disclosure of Gangwal et al. in U.S. Pat. No. 6,951,635, where ammonium hydroxide is used as a base and the coprecipitation process occurs at around room temperature, metal concentration and solution temperature should be carefully monitored throughout the co-precipitation process described herein. Slurry temperatures should be controlled in the range between 25° C. and 75° C., preferably between 50° C. and 70° C. The pumping rates should be adjusted to ensure complete reaction between the zinc oxide precursor, the aluminum oxide precursor and the alkali metal hydroxide such that a slurry pH can be reliably controlled to be at between pH 5.0 to pH 10.0, more preferably between pH 5.5 to 7.5. The resulting precipitated liquor contains the precipitated zinc oxide precursor and alumina oxide precursors and the soluble salts remaining from the precipitation reaction. Small amounts of these salts remain after the precipitation liquor is removed. For the sorbent generated by U.S. Pat. No. 6,951,635, the trace ammonia salts remaining are decomposed during the calcination process. For the sorbents of this disclosure, the alkali metals do not decompose during the calcination process and remain in the sorbent. As this alkali metal is dispersed at the same "near-molecular-level" as the precipitated precursors, the alkali metal can have a significant impact on sorbent properties and performance even at trace concentrations. Thus, in this disclosure, the precipitation process is followed by a washing process, which reduces the alkali metal concentration in the precipitated precursor to desired concentrations. These desired ranges for the alkali metal are 25 to 2500 parts per million by weight (ppmw), preferably 50 to 1000 ppmw, and most preferably 75 to 750 ppmw. Advantageously, the process comprises the steps of forming a slurry from the washed cake which comprises a precipitated intermediate of zinc oxide and a precipitated intermediate of aluminum oxide, and spray drying the slurry to form substantially spherical particles. Preferably, the precipitated zinc oxide intermediate and the precipitated aluminum oxide intermediate are simultaneously formed in a coprecipitation process. Typically, the slurry containing the intermediates which is used for spray drying, has 75 to 90 weight percent weight loss on ignition at a temperature of 500° C. or greater. Advantageously the zinc oxide intermediate, calculated as ZnO, comprises at least about 50 wt % of the solids content, up to about 80 wt % of the solids content of the slurry residue remaining after a loss on ignition at a temperature of 500° C. or greater, hereafter referred to as dry solids content of the slurry. Advantageously, the aluminum oxide intermediate, calculated as $Al_2O_3$, comprises at least about 20 wt % of the dry solids content of the slurry, up to about 50 wt % of the dry solids content of the slurry. The spray dried particles are calcined for a time and at a temperature sufficient to convert substantially all of the aluminum oxide precursor to zinc aluminate, and to convert substantially all the remaining zinc oxide precursor to zinc oxide. In one preferred aspect of the disclosure, the slurry is treated with sufficient strong acid to reduce the pH to less than about 5.0, preferably to about 4.0 to 4.5. Non-limiting examples of strong acids include hydrochloric acid, nitric acid, phosphoric acid and sulfuric acid. As will be appreciated by those in the art, organic acids may also be used. In accordance with this aspect of the disclosure, it has been found that reducing the slurry pH to less than 5.0, before spray drying improves the attrition properties, i.e., reduces the attrition loss and the AI, of the zinc oxide-based sorbent composition without affecting its reactivity for $H_2S$ and COS.

The present disclosure additionally includes preferred processes for removing sulfur contaminants from a warm gas employing the zinc-oxide based sorbents of the disclosure. In particular, the zinc-oxide based sorbents of this disclosure have been found capable of reducing the combined $H_2S$ and COS contents of warm gases to low levels, preferably below about 75 ppmv (parts per million by volume), more preferably to levels below about 25 ppmv, and most preferably to levels below about 10 ppmv, by treatment of the warm gas at temperatures as low as 350° F. (177° C.) and at temperatures as high as 1150° F. (621° C.). Thus, the desulfurization sorbents and processes of the disclosure provide a substantial degree of flexibility allowing removal of undesirable sulfur components from a feed gas.

The zinc-oxide based sorbents are employed in transport reactor systems in preferred process embodiments. Such transport reactor systems are known in the art and descriptions can be found in literature and patents such as found in the disclosure by Gangwal, et al., in U.S. Pat. No. 6,951,635. Such preferred process embodiments can be achieved, as a result, at least in part, of the high reactivity, and high attrition resistance of the zinc oxide-based sorbents of the current disclosure. Moreover, the zinc-oxide based sorbents of the disclosure are capable of retaining their high reactivity, and high attrition resistance over a substantial number of absorption-regeneration cycles conducted in accord with preferred sorbent regeneration process embodiments of the disclosure which are carried out at temperatures in the range of between about 1000° F. and about 1500° F. (about 538° C. to about 816° C.), preferably within the range of between about 1000° F. and about 1450° F. (about 538° C. and about 788° C.).

4. BRIEF DESCRIPTION OF THE FIGURES

Figure 2:
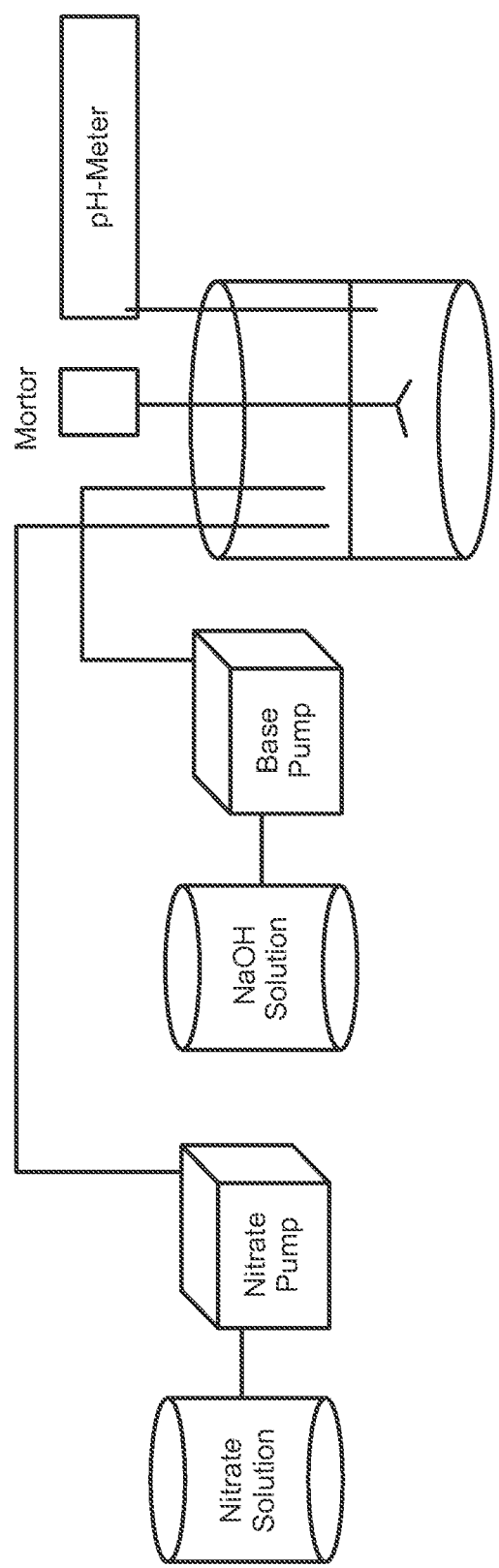
Figure 3:
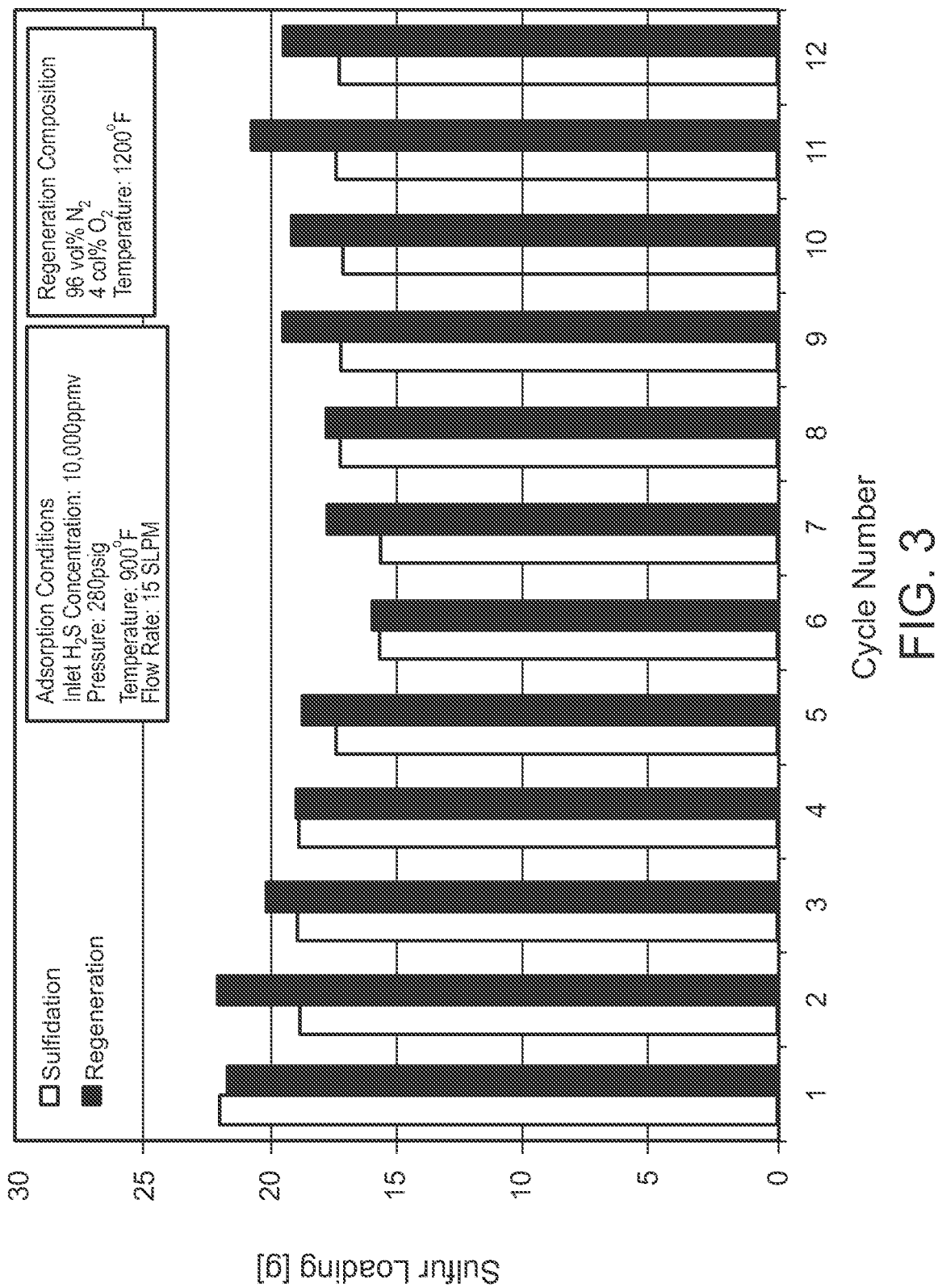

FIG. 1 shows the lab scale production steps.
FIG. 2 shows co-precipitation equipment.
FIG. 3 shows sulfur loading and regeneration for multiple cycles under standard test conditions.

5. DETAILED DESCRIPTION OF THE DISCLOSURE

In the following detailed description, preferred embodiments of the disclosure are described to enable practice of the disclosure. Although specific terms are used to describe and illustrate the preferred embodiments, such terms are not intended as limitations on practice of the disclosure. Moreover, although the disclosure is described with reference to the preferred embodiments, numerous variations and modifications of the disclosure will be apparent to those of skill in the art upon consideration of the foregoing, together with the following detailed description.

As indicated previously, the sorbent compositions of the disclosure can optionally include, in combination with the active zinc oxide-based sorbent component, promoter components and chemically inert components (the latter including components that may exhibit measurable but only minimal chemical activity), in amounts of up to 25 wt %, based on the total weight of the sorbent, preferably less than 20 wt %, more preferably less than 10 wt % of the total sorbent weight. Sorbent compositions which are substantially free of inert components such as binders or the like are currently preferred in the practice of the disclosure.

For ease of discussion and clarity of disclosure, the sorbent compositions disclosed and discussed hereinafter shall be assumed to be free of promoter and inert components, except where stated to the contrary. Thus, the terms "sorbent", "sorbents" "sorbent compositions", "sorbent materials" and the like, are used hereinafter to refer to the active zinc component except in those specific instances in which the disclosure is specifically directed to compositions including one or more of the optional promoter or inert components.

The zinc oxide-based sorbent compositions of the disclosure are advantageously prepared from starting materials including a precipitated zinc oxide precursor and a precipitated aluminum oxide precursor, which are used in predetermined amounts or weight ratios. Unless expressly stated otherwise, all weight percentages are calculated and expressed based on the "adjusted weight" of the sorbent components and compositions. "Adjusted weight" of the sorbent compositions, sorbent components, sorbent component precursors, slurries and slurry components used to form sorbent of this disclosure, as used herein, refers to the actual weight adjusted as necessary so that the zinc oxide component or precursor is calculated as ZnO, and the aluminum oxide component or precursor is calculated as $Al_2O_3$, and the zinc aluminate component is calculated as $ZnAl_2O_4$. Further, unless expressly stated otherwise, all weight percentages of sorbents (including sorbents present in both green and calcined states), sorbent components, sorbent component precursors, slurries and slurry components used to prepare the sorbents, are expressed herein such that the zinc oxide component or precursor, the aluminum oxide component or precursor, and the sorbent compositions, are in each case calculated as adjusted weight.

The terms "total ZnO" and "total zinc oxide" with reference to sorbent compositions, sorbent components, sorbent component precursors, slurries and slurry components used to form sorbent compositions of the disclosure, refers to the total adjusted weight of uncombined and combined zinc oxide, i.e., the zinc oxide which is present in the final sorbent composition as the zinc oxide phase, and the zinc oxide content of the zinc aluminate phase in the final sorbent composition, respectively. For purposes of these calculations, the zinc aluminate phase, $ZnAl_2O_4$, is taken to be the combination of ZnO and $Al_2O_3$.

The term, "substantially free", is used herein to mean a weight percent content or an adjusted weight percent (where applicable) content of about 1 percent or less.

The term, "compacted bulk density", is used herein to mean the density as determined by ASTM standard method D4781-99 or equivalent.

"Crystallite size" of the zinc oxide (ZnO) phase and the zinc aluminate ($ZnAl_2O_4$) phase is determined by x-ray diffraction line broadening analysis of the most intense peak for each of these phases. The qualitative data for this analysis were collected using CuK generated at 45 kV and 40 mA on a Shimadzu model XRD-6000 outfitted with a 1° divergence slit, a 0.3 mm receiving slit, and a diffracted beam monochromator. Samples are initially inspected to ensure that the particles or agglomerations of particles are between 40 and 70 microns. Samples that do not meet these specifications are ground using a mortar and pestle with moderate hand pressure for no more than one minute to reduce and homogenize particle size.

The XRD pattern is measured with a Shimadzu XRD-6000. This instrument uses a copper source stimulated with 45 kV and 40 mA to generate Cu Kα x-rays with a maximum output of 2 kW. These x-rays pass through a 1° divergence slit. The sample is scanned from 5 to 70 degrees 2θ. The scan rate is 0.02 degrees per 2 seconds. A 3 mm receiving slit and diffracted beam monochromator process the radiation prior to a sodium iodide scintillation counter, which measures counts per second. The operation and data collection of the Shimadzu 6000 is controlled by Shimadzu XRD-6000 V4.1 software.

The raw data generated by the Shimadzu XRD-6000 V4.1 software is reformatted by a python language program as suitable input for software for interpreting and analyzing the XRD diffraction patterns. The interpretation software is Jade 9.1. One of the values that is calculated by the Jade software is crystallite size. The crystallite size is calculated according to the formula:

$$\text{Size(Angstroms)} = \{0.9 \times W / [\text{FWHM} - (GW)^2]^{1/2}\} / \cos\theta$$

Where W, the x-ray wavelength for the Cu source, is 1.540562 angstroms, FWHM is the reported peak width at half maximum in radians as determined by the software, GW is the inherent broadening factor for this instrument and theta is half the reported peak centroid. The final reported crystallite size for each crystalline phase is the crystallite size calculated by the Jade software for the most intense peaks for the zinc oxide and zinc aluminate phases.

According to one preferred aspect of the disclosure, the attrition resistant zinc oxide-based sorbent of the disclosure is prepared by spray drying a slurry which comprises a precipitated zinc oxide precursor and a precipitated aluminum oxide (alumina) precursor. These precipitated zinc oxide precursors and precipitated alumina precursors are prepared by precipitating nitrates, sulfates, chlorides, acetates, alkoxides, and like salts of zinc and aluminum with alkali metal hydroxides and carbonates as is well known to those skilled in the art. Precipitated zinc oxide and alumina precursors can readily be combined to achieve a significantly higher mixing at the molecular level as compared to mixing of the oxides. Included with the highly-mixed precipitated phases are the soluble alkali metal salts that are formed during the precipitation process. In turn, the final zinc oxide-based sorbent is found to contain zinc oxide (ZnO) phase and zinc aluminate (ZnAl$_2$O$_4$) phases that are uniformly distributed throughout the sorbent, and each of the two phases is characterized by a relatively small crystallite size. Because the alkali metal remains after calcination, its uniform mixing with the small crystallites of zinc oxide and zinc aluminate can significantly affect sorbent properties and performance even at trace concentrations. Thus, a washing step is added after the precipitation process to achieve the desired concentration range of the alkali metal. The desired range of alkali metal concentrations is 25 to 2500 ppmw, preferably 50 to 1000 ppmw, and more preferably 75 to 750 ppmw.

Currently preferred zinc oxide and alumina precursors are Zn(NO$_3$)$_2$ and Al(NO$_3$)$_3$, respectively. Advantageously, at least 50 wt % (as zinc oxide) of dry solids content of the slurry is made up by the precipitated zinc oxide precursor or derivative. Advantageously, the zinc oxide precursor is a wet filtered cake recovered directly from precipitation and washing processes or steps. Preferably at least 20 wt % (as Al$_2$O$_3$) of dry solids content is made up by the precipitated aluminum oxide precursor or derivative. Advantageously, the aluminum oxide precursor is also a wet filtered cake well mixed with the zinc oxide precursor cake recovered directly from precipitation and washing processes or steps. Preferably, the precipitated zinc oxide precursor and the precipitated aluminum oxide precursor are simultaneously formed in a coprecipitation process. See FIG. 1.

Although not currently preferred, the slurry can also contain active metal promoter materials, or precursors thereof, binder materials or precursors thereof, and/or inert refractory oxide materials or precursors thereof. Preferably, the total dry solids content of such materials, based on adjusted weight, is less than about 25 wt %, more preferably less than about 20 wt %, even more preferably less than about 10 wt %, most preferably, less than about 5 wt %. Exemplary active metal promoters include metal oxides such as nickel or other Group 6, 8, 9, or 10 metal oxides, copper oxides, and oxides of iron, silver, gold. Binders and inert refractory inorganic oxides can include naturally occurring clays, calcium sulfate, silicas, titanias, aluminosilicates, aluminates, zeolites and the like.

In a preferred embodiment of the disclosure, the slurry is further treated with sufficient strong acid to reduce the pH to less than 5.0, preferably to 4.0 to 4.5. Reducing the slurry pH to below 5.0, preferably to 4.0 to 4.5, before spray drying has been found to improve the attrition properties of the sorbent. The slurry is spray dried using conventional processes and apparatus to form substantially spherical spray dried particles.

It is to be noted that acid treatment of the precipitated zinc oxide precursor and/or the precipitated aluminum oxide precursor prior to spray drying, can, in at least some cases, change the chemical identity of the precursor. Nevertheless, as long as the modified precursor, (or precursors), is readily convertible to the final oxide product(s) by calcination, such modification does not interfere with formation of the sorbent. As will be apparent to the skilled artisan, other treatments which modify the chemical identity of the oxide precursor(s) may also be applied to the oxide precursors, as long as the modified precursor, (or precursors), is readily convertible to the final oxide product(s) by calcinations. Such modified or derivative, precipitated oxide precursors are included within the scope of the terms, "precipitated zinc oxide precursor", and "precipitated aluminum oxide precursor", as those terms are used herein.

Preferably the spray drying conditions are adjusted to provide "green" spray dried particles of a size such that at least 80 percent by volume of the particles have a diameter between 50 and 255 µm. Conventional spray drying processes and apparatus are well known to those skilled in the art. The selection of apparatus and process conditions to achieve the foregoing particle size distribution can be readily achieved by a skilled artisan apprised of present disclosure. Advantageously the slurry is spray dried into a conventional, heated zone which is heated by a feed gas provided at a temperature sufficient that outlet gasses from the spray drying chamber have a temperature above about 265° F. (129° C.). Preferably the slurry has a solids content (upon drying at 265° F.) of between about 10 and 25 wt % based on the adjusted weight of the slurry, and thus undergoes a loss of water content of between 75 and 90 wt % at 265° F.

The "green" spray dried particles are preferably calcined in an oxygen containing environment to convert the zinc and aluminum hydroxides or carbonates (or mixtures of hydroxides and carbonates) to zinc oxide, aluminum oxide and zinc aluminate in the appropriate composition and size to make the fluidizable, attrition resistant active zinc sorbent. The calcining step also results in shrinkage of the spray dried particles to an average size distribution within the range of 35 to 175 µm. Typically, the calcining temperature exceeds 300° C., and is preferably a temperature exceeding 500° C., more preferably 600° C. or higher. Preferably the calcining is conducted at a temperature that is about the same, or higher, than the intended initial regeneration temperature. This technique, as will be known to the skilled artisan, can enhance stabilization of the physical and chemical properties of the sorbent during its subsequent use.

In one preferred aspect of the disclosure, the zinc-oxide based sorbent is prepared by the following steps:

An aqueous solution containing zinc nitrate and aluminum nitrate in amounts corresponding to adjusted weight percent of 58 wt % ZnO to 42 wt % $Al_2O_3$. An alkali metal hydroxide solution or alkali metal carbonate solution (10 to 25 wt %, preferably around 15 wt %) in a separate container is prepared, and the two solutions are pumped at monitored flow rates into a well stirred container at controlled flow rates to precipitate the zinc oxide and aluminum oxide intermediates. Preferred alkali metal bases to use are sodium hydroxide and sodium carbonate. The precipitate is filtered and is washed with deionized water using pressure or vacuum filtration to achieve desired levels of sodium and nitrate ions and to form a wet cake. It is important at this stage to use a sufficient amount of deionized water to wash the wet cake in order to achieve desired levels of alkali metal ion concentrations. It is preferable to use warm deionized water to wash the wet cake.

Sufficient distilled water is added to reslurry the washed cake and to provide a second slurry. Sufficient strong acid is added to the slurry to bring the pH down to less than about 5.0. The resultant slurry is spray dried in a drying chamber with an air outlet temperature of 350° F. to 360° F. to produce microspherical particles of a size in the range of preferably 35 to 350 µm and more preferably in the range of 40 to 255 µm. The spray dried particles are calcined in air at a minimum temperature of about 600° C. to convert the zinc oxide and alumina precursors into zinc aluminate and zinc oxide.

The disclosure has been described in considerable detail with reference to its preferred embodiments. However, it will be understood that numerous variations and modifications can be made without departure from the spirit and scope of the disclosure as set forth in the foregoing detailed disclosure and defined in the appended claims.

Unless defined otherwise, all technical and scientific terms used herein have the same meaning as commonly understood by one of ordinary skill in the art to which this disclosure belongs. The article "a" and "an" are used herein to refer to one or more than one (i.e., to at least one) of the grammatical object(s) of the article. By way of example, "an element" means one or more elements.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the disclosure. The upper and lower limits of these smaller ranges may independently be included or excluded in the range, and each range where either, neither or both limits are included in the smaller ranges is also encompassed within the disclosure, subject to any specifically excluded limit in the stated range. Where the stated range includes one or both of the limits, ranges excluding either or both of those included limits are also included in the disclosure.

Throughout the present specification, the terms "about" and/or "approximately" may be used in conjunction with numerical values and/or ranges. The term "about" is understood to mean those values near to a recited value. For example, "about 40 [units]" may mean within ±25% of 40 (e.g., from 30 to 50), within ±20%, ±15%, ±10%, ±9%, ±8%, ±7%, ±6%, ±5%, ±4%, ±3%, ±2%, ±1%, less than ±1%, or any other value or range of values therein or there below. Furthermore, the phrases "less than about [a value]" or "greater than about [a value]" should be understood in view of the definition of the term "about" provided herein. The terms "about" and "approximately" may be used interchangeably.

The following Example further illustrates the disclosure and is not intended to limit the scope of the disclosure. In particular, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

6. EXAMPLE

RTI-3 Lab-Scale Production Procedure
See FIG. 2 for the co-precipitation equipment
Chemicals
$Zn(NO_3)_2.6H_2O$, reagent grade>98%
$Al(NO_3)_3.9H_2O$, ACS reagent grade>98%
NaOH pellets, reagent grade>98%
Concentrated $HNO_3$, 65~67%, ACS reagent
Equipment
Couple of 4 L containers
pH & conductivity meter, model: HACH, HQ40d
Two Masterflex L/S with Easy-Load II peristaltic pumps
Mechanical mixer Model: Aron 750
Synthesis Procedure
Solution Preparation
Weigh the metal salts (amount list in the table) and place them in a 4 L beaker. Add deionized (DI) $H_2O$ to make about 1500 ml total solution.

| Chemicals | Amount (g) |
| --- | --- |
| Zn(NO$_3$)$_2$·6H$_2$O | 399.15 |
| Al(NO$_3$)$_3$·9H$_2$O | 613.78 |
| NaOH (10% solution) | ~3050 g |
| D.I. H$_2$O | Add as required |

Mechanically mix salt slurry to make sure that all salts are dissolved and a clear solution is obtained.

Heat metal salt solution to 50-70° C., and maintain this temperature for the duration of the co-precipitation reaction.

Make 10 wt % of NaOH solution by mixing NaOH pellets and DI H$_2$O.

Make 5 molar HNO$_3$ solution using concentrated HNO$_3$ acid solution and DI H$_2$O. Use extreme caution during this mixing step as the reaction between concentrated nitric acid and water is very rapid and exothermic.

Co-Precipitation

Equip a precipitation tank with a mechanical stirrer, a calibrated pH meter and two peristaltic pumps, as shown in FIG. 2.

Add around 600 ml of DI water into 4 L beaker such that the solution can be stirred and the pH electrode is immersed to measure the pH properly.

Insulate the precipitation tank with glass wool. Heat the water to 50-70° C.

Turn on both peristaltic pumps simultaneously. Pump the salt solution at the speed of about 30-35 ml/min and adjust the flow rate of the NaOH solution (60-70 ml/min) in order to maintain the target pH of the precipitating solution between 5.5 and 7.5.

Continue to stir and maintain temperature of the precipitated mixture between 50 and 70° C. for another 30 min.

Filtration and Washing

Filter the precipitate using either a pressure filter or a vacuum filter

Wash the precipitate with DI water until the sodium levels are in the desired range Re-Slurry and Spray Drying Slurry Preparation Measure the solid loading in the wet cake. Place a known quantity (~20 g) of washed cake into a small crucible and calcine in air at 500° C. for 2 hours and weigh the collected sample (g).

Calculate water to be added to make 10 wt % solid loading slurry: Metal Oxide (g)/(Wet Cake Weight (g)+X) =0.10, where X is the amount of water to be needed.

Mix the cake with water (X) in the plastic beaker for at least 30 minutes.

Slowly add HNO$_3$ solution to slurry while mixing.

Continue to mix for 30 minutes.

Filter the slurry to remove potential large particles, which may cause blocking during spray drying.

Spray Drying

Clean up the spray dryer

Set initial inside and outside temperatures to 320° C. and 125° C., respectively Nozzle-08; pressure 0.75 bar, flow 25-35%

Slurry flow rate=50 ml/min

Spray dry the filtered slurry at the above conditions.

Calcination of Spray Dried Powder

Dry the spray dried powder at 120° C. overnight

Calcine the spray dried powder in flowing air for two hours.

Batches of sorbent were produced in-house using the general lab-scale production procedure above. Calcined batches were combined and screened to obtain particles in the range of 25-150 µm. The calcined sorbent was loaded in a reactor and repetitively exposed to a syngas containing sulfur (as H$_2$S) and loaded to capacity and then regenerated. FIG. 3 shows the results from this repetitive testing indicating that the sulfur was adsorbed and regenerated from the sorbent for twelve cycles with a constant sulfur capacity within the limits of experimental variability.

During sulfidation of the sorbent, the following reaction occurs:

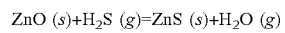

The loading capacity is relatively constant and near the theoretical loading capacity and also indicates stable performance of the material through multiple cycles, as shown in FIG. 3.

It is to be understood that, while the disclosure has been described in conjunction with the detailed description, thereof, the foregoing description is intended to illustrate and not limit the scope of the disclosure. Other aspects, advantages, and modifications of the disclosure are within the scope of the claims set forth below. All publications, patents, and patent applications cited in this specification are herein incorporated by reference as if each individual publication or patent application were specifically and individually indicated to be incorporated by reference.

What is claimed is:

1. A fluidizable, attrition-resistant sorbent for removing at least one reduced sulfur species from a feed stream comprising:
   substantially spherical particles, said particles comprising at least 75 wt % of an active zinc component consisting essentially of a zinc oxide phase and a zinc aluminate phase, each of said phases having a crystallite size of less than about 50 nm as determined by x-ray diffraction line broadening analysis,
   said active zinc component having a total zinc oxide content, calculated based on the combined zinc oxide of said zinc oxide phase and said zinc aluminate phase, of from about 50 wt %, to about 80 wt %, based on the weight of said active zinc component, wherein the residual sodium level in the solid phase is in the range of between 25 parts per million by weight of sodium and 2500 parts per million by weight of sodium.

2. The fluidizable, attrition-resistant sorbent of claim 1, wherein the residual sodium level in the solid phase is in the range of between 50 parts per million by weight of sodium and 1000 parts per million by weight of sodium.

3. The fluidizable, attrition-resistant sorbent of claim 1, wherein the residual sodium level in the solid phase is in the range of between 75 parts per million by weight of sodium and 750 parts per million by weight of sodium.

4. The fluidizable, attrition-resistant sorbent of claim 1, wherein the reduced sulfur species is H$_2$S or COS.

5. A process for preparing a fluidizable, attrition resistant, active zinc oxide containing sorbent comprising the steps:
   forming a first slurry by combining an aqueous solution of a zinc oxide precursor and aluminum oxide precursor with an aqueous solution of an alkali metal hydroxide such that the solids content comprises a precipitated zinc oxide precursor and a precipitated aluminum oxide precursor, said precipitated zinc oxide precursor and said precipitated aluminum oxide precursor being present in an amount, calculated as ZnO, and Al$_2$O$_3$, respectively, such that said precipitated zinc oxide precursor constitutes between about 50 wt %, and about 80 wt %, of the total solids content of said precipitated zinc oxide precursor and said precipitated aluminum oxide precursor in said slurry, and such that the pH of this slurry during the mixing and combining step is maintained between the values of 5.5 and 7.5;

separating the liquid phase of the first slurry from the solid phase by a separating means; washing the filtered solid phase with water, preferably deionized water, to achieve a residual sodium level in the solid phase of between 25 parts per million by weight of sodium and 2500 parts per million by weight of sodium;

treating the separated solid material from the first slurry with water and concentrated acid to generate a second slurry wherein the pH of the second slurry is adjusted with acid to be between 3.5 and 5.0;

spray drying the second slurry to form spray dried particles; and calcining said spray dried particles to provide fluidizable, attrition resistant, active zinc oxide containing sorbent particles comprising a two-phase component consisting essentially of a zinc oxide phase and a zinc aluminate phase.

6. The process of claim 5, wherein said spray drying step is conducted under conditions sufficient to provide calcined particles having a size range of between 35 μm and 175 μm.

7. The process of claim 5, wherein said zinc oxide constitutes at least about 50 wt % of the total solids content of said zinc oxide precursor and said aluminum oxide precursor in said slurry.

8. The process of claim 5, wherein the active zinc oxide containing sorbent particles comprise zinc oxide trains less than 50 nm diameter.

9. The process of claim 5, wherein the active zinc oxide containing sorbent particles comprise zinc oxide grains about 13 nm to about 20 nm diameter.

10. The process of claim 5, wherein said slurry additionally comprises at least one additional material selected from the group consisting of promoter precursors, binder precursors and refractory oxide precursors, and wherein said additional material is present in amount selected to provide fluidizable, attrition resistant, active zinc oxide containing sorbent particles containing at least about 75 wt % of said two-phase component consisting essentially of a zinc oxide phase and a zinc aluminate phase.

11. The process of claim 5, wherein all or part of the alkali metal hydroxide is replaced with an alkali metal carbonate.

12. The process of claim 5, wherein the alkali metal hydroxide is sodium hydroxide.

13. The process of claim 5, wherein the residual sodium level in the solid phase is between 50 parts per million by weight of sodium and 1000 parts per million by weight of sodium.

14. The process of claim 5, wherein the acid used for acidification of the second slurry is nitric acid.

15. The process of claim 5, wherein the pH range of the second slurry is adjusted to be between 4.0 and 4.5.

16. The process of claim 5, wherein the formation of the first slurry is performed at a temperature of ambient to about 85° C.

17. The process of claim 16, wherein the formation of the first slurry is performed at a temperature of about 50° C. to about 80° C.

18. The process of claim 17, wherein the formation of the first slurry is performed at a temperature of about 65° C. to about 75° C.

19. The process of claim 5, wherein the separating of the liquid phase of the first slurry from the solid phase includes a washing process performed at temperatures between ambient and about 85° C.

20. The process of claim 5, wherein the separating of the liquid phase of the first slurry from the solid phase includes a washing process performed at temperatures between about 50° C. and about 80° C.

21. The process of claim 5, wherein said spray dried particles are calcined at about 500° C. to about 900° C.

\* \* \* \* \*